US008132157B2

(12) United States Patent
Dhuvur et al.

(10) Patent No.: US 8,132,157 B2
(45) Date of Patent: Mar. 6, 2012

(54) METHOD OF AUTOMATIC REGRESSION TESTING

(75) Inventors: Charulatha Dhuvur, Poughkeepsie, NY (US); Eli M. Dow, Poughkeepsie, NY (US); Marie R. Laser, Poughkeepsie, NY (US); Jassie Yu, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1085 days.

(21) Appl. No.: 12/015,751

(22) Filed: Jan. 17, 2008

(65) Prior Publication Data
US 2009/0187788 A1     Jul. 23, 2009

(51) Int. Cl.
*G06F 9/44* (2006.01)
(52) U.S. Cl. ........ 717/124; 717/126; 717/127; 717/131; 714/38.1
(58) Field of Classification Search .................. None
See application file for complete search history.

(56) References Cited

U.S. PATENT DOCUMENTS

| | | | | |
|---|---|---|---|---|
| 5,651,111 | A * | 7/1997 | McKeeman et al. | 714/38.1 |
| 5,673,387 | A | 9/1997 | Chen et al. | |
| 5,694,540 | A | 12/1997 | Humelsine et al. | |
| 5,784,553 | A * | 7/1998 | Kolawa et al. | 714/38.1 |
| 6,305,010 | B2 * | 10/2001 | Agarwal | 717/126 |
| 6,550,057 | B1 * | 4/2003 | Bowman-Amuah | 717/126 |
| 6,766,475 | B2 | 7/2004 | Segal et al. | |
| 6,907,546 | B1 * | 6/2005 | Haswell et al. | 714/38.11 |
| 6,966,013 | B2 | 11/2005 | Blum et al. | |
| 6,986,125 | B2 * | 1/2006 | Apuzzo et al. | 717/124 |
| 7,178,063 | B1 | 2/2007 | Smith | |
| 7,735,080 | B2 * | 6/2010 | Barturen et al. | 717/177 |
| 8,006,204 | B2 * | 8/2011 | Killian et al. | 716/100 |
| 2003/0028856 | A1 * | 2/2003 | Apuzzo et al. | 717/124 |
| 2003/0046681 | A1 * | 3/2003 | Barturen et al. | 717/177 |
| 2004/0088602 | A1 | 5/2004 | Cohen et al. | |
| 2006/0107121 | A1 | 5/2006 | Mendrala et al. | |
| 2006/0129992 | A1 | 6/2006 | Oberholtzer et al. | |
| 2006/0225041 | A1 | 10/2006 | Girolami-Rose | |
| 2007/0006041 | A1 | 1/2007 | Brunswig et al. | |
| 2007/0006043 | A1 | 1/2007 | Pins | |
| 2007/0074149 | A1 * | 3/2007 | Ognev et al. | 717/101 |
| 2010/0153785 | A1 * | 6/2010 | Keromytis et al. | 714/38 |

OTHER PUBLICATIONS

Title: Compatibility and Regression Testing of COTS-Component-Based Software, author: Mariani, L et al, source: IEEE, dated: May 20, 2007.*
Title: Regression Test Selection for Black-box Dynamic Link Library Components author: Jiang Zheng et al, dated: May 20, 2007.*

* cited by examiner

*Primary Examiner* — Chameli Das
(74) *Attorney, Agent, or Firm* — Cantor Colburn LLP; Steven Chiu

(57) ABSTRACT

A method of automatic regression testing includes loading binary code representing a first version of a program, extracting a second version of the program embedded within the binary code of the first version of the program, executing a standalone model of the second version of the program based on the extracted second version, wherein executing includes executing a set of instructions to identify at least one error, determining if the standalone model causes the at least one error, and storing results based on the determining.

3 Claims, 2 Drawing Sheets

METHOD OF AUTOMATIC REGRESSION TESTING

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Technical Field

This invention generally relates to regression testing. More particularly, this invention relates to a method of automatic regression testing through embedding binary code.

2. Description of Background

Generally, if an error or errors occur in a program or application, a user debugging the program performs a regression analysis or test to determine if the error(s) were caused by introduction of new changes to the program. Oftentimes the testing requires rigorous testing of all changes to the program. This testing of all changes may be complicated, or in some cases, impossible, if all the changes are not logged, accessible, and/or documented.

SUMMARY

A method of automatic regression testing includes loading binary code representing a first version of a program, extracting a second version of the program embedded within the binary code of the first version of the program, executing a standalone model of the second version of the program based on the extracted second version, wherein executing includes executing a set of instructions to identify at least one error, determining if the standalone model causes the at least one error, and storing results based on the determining.

Additional features and advantages are realized through the techniques of the exemplary embodiments described herein. Other embodiments and aspects of the invention are described in detail herein and are considered a part of the claimed invention. For a better understanding of the invention with advantages and features, refer to the detailed description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains an exemplary embodiment, together with advantages and features, by way of example with reference to the drawings.

DETAILED DESCRIPTION

According to an exemplary embodiment, a method is provided which significantly increases the simplicity of regression testing. This increase in simplicity results in better adaptability to changes in computer programs, and an increased ability to analyze errors resulting from changes in computer programs.

According to an exemplary embodiment, a method of automatic regression testing includes embedding binary code from a previous software release within a new software release. The embedded binary code may be used in regression testing as a control point for analysis to compare the previous version of the program with the newer version. In this manner, all new changes may be efficiently tested and/or analyzed without iteration through data logs of changes resulting in a more thorough analysis of the program changes. The testing may be automated due to the binary code being embedded, as the changes are inherent, and little interaction between the process and a computer user or administrator may be necessary during testing. This may reduce the possibility for error during testing.

According to an exemplary embodiment, the new software release may be linked with the embedded binary code from its previous release. If an error is detected during program execution, automatic regression testing may be performed. Alternatively, automatic regression testing may be performed at any time, for example, continuously during program execution, or automatic regression testing may be performed between software version releases. In an example where a set of instructions causes an error, the set of instructions causing the error may be run using the linked-embedded binary code from the previous software release in an automatic fashion. If the set of instructions is executed successfully with the embedded code, but causes errors using the newer program release, the error is more likely to be caused by changes in the newer version of the software. Therefore, the automatic regression test algorithm may return a result identifying that a change in the program has resulted in a program error. The automatic regression test algorithm may also prompt for user feedback for further action such as a detailed test analysis (e.g., test log or results), or other similar feedback.

Figure 1:
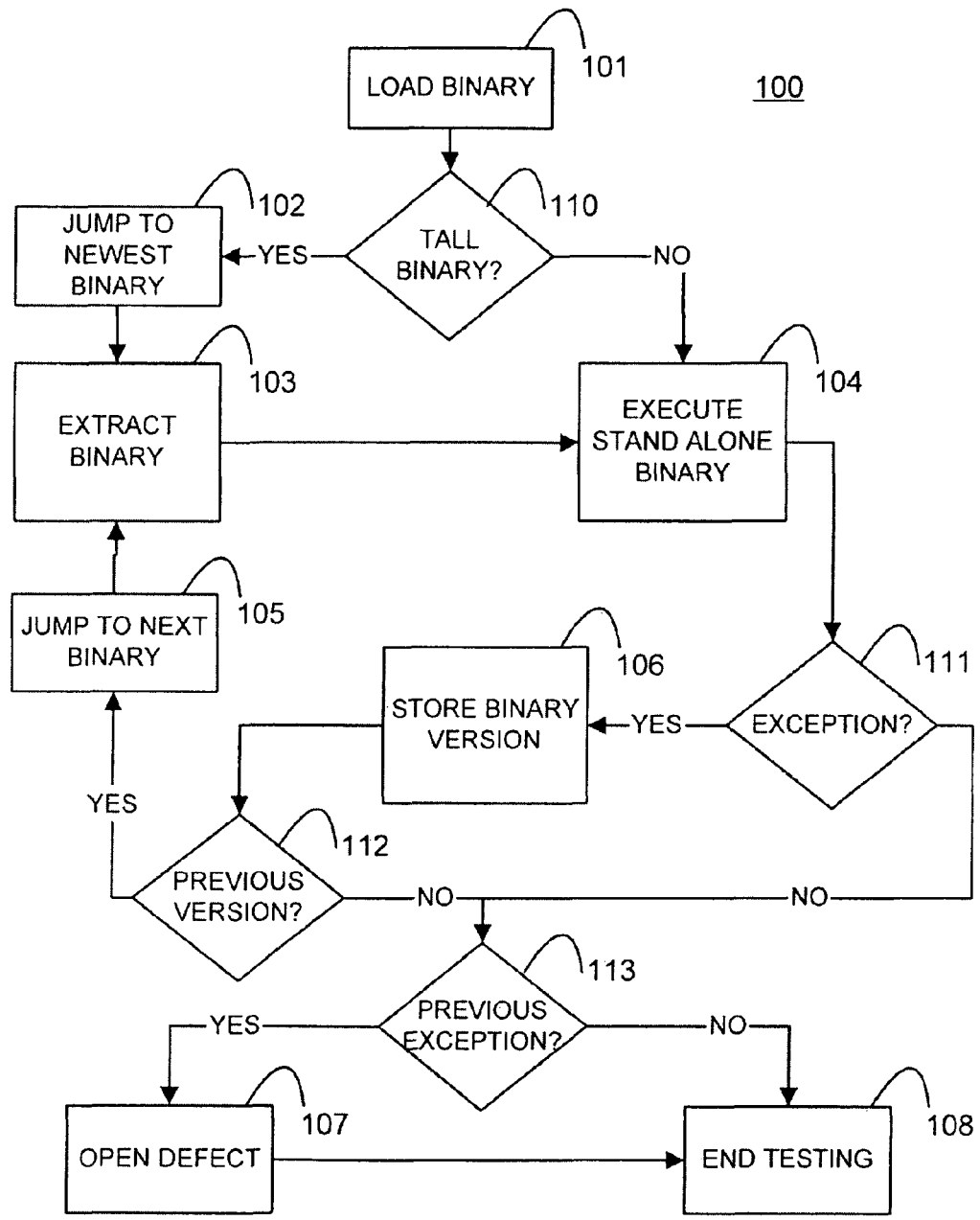
FIG. 1 illustrates a flowchart of a method of automatic regression testing, according to an exemplary embodiment.

Turning to FIG. 1, a flowchart of a method of automatic regression testing is illustrated. According to FIG. 1, the method 100 includes loading binary code for a program at block 101. The binary code may be binary code for a program which has thrown an exception, fault, and/or other type or error, or for which automatic regression testing has been initiated by any other suitable means (e.g., through continuous testing or software release analysis). The method 100 may be initiated by the exception itself (i.e., fully automated testing), may be initiated through user input (partially automated testing), may be run continuously, and proceeds automatically with testing.

The method 100 further includes verifying if the loaded binary (i.e., from block 101) is a tall binary at block 110. For example, if there is embedded binary code or a plurality of different modules/program versions stacked or embedded within the loaded binary code, the loaded binary code may be termed a tall binary. If the loaded binary is a tall binary, the method 100 includes jumping to the newest version of the program at block 102.

The method further includes extracting a previous (or embedded) program version at block 103. The previous program version is in the form of an embedded binary code linked to the newest program version of the binary code loaded at block 101. Upon loading the embedded binary code, or at substantially the same time as loading the embedded binary code, the method includes executing a standalone version of the embedded binary code at block 104. The standalone version being executed is fed any instructions which may have caused the error(s) initiating the method 100. The standalone version may be a model identical to the previous version of the program.

As used herein, a standalone model, standalone version, or other "standalone" binary code execution, is an isolated program based on binary code. The standalone model is isolated in that it is executed as if it is a separate program, and may be given instructions as if it is a separate program. It follows that the standalone model also outputs results as if it is a separate program as well.

The method 100 further includes verifying if any exceptions (i.e., errors) have occurred in the standalone version at block 111. If an error(s) has occurred, the method includes logging and/or storing the binary version at block 106. This stored result may be accessed during or after testing by a user or administrator to determine which changes may have caused the error(s). Further, the method 100 includes determining if there is another stored binary code version at block 112. For example, a plurality of previous versions of a program may be embedded and linked within the binary code loaded at bock 101. If there is another binary code version embedded, the method includes jumping to a next binary code version at block 105. Therefore, the method 100 may iterate through blocks 103, 104, 111, 106, 112, and 105 and function as described above if there are previous versions of binary code embedded within the binary code loaded at block 101, and if there are errors thrown in respective standalone executions at block 111.

If any particular standalone execution does not result in an error at block 111, the method 100 includes determining if the binary code loaded at block 101 includes a previous defect (i.e., a previous binary code version at any point in automatic regression testing results in an error) at block 113. If there is a previous defect, the method 100 includes opening the defect against a version stored at block 106, at block 107, and ending the automatic testing algorithm at block 108. If there is no previous defect, the method 100 includes ending testing at block 108.

Alternatively, if the iterative portion of the method 100 described hereinbefore "runs out" or exhausts embedded previous versions of binary code using verification at block 112, the method 100 includes determining if the binary code loaded at block 101 includes a previous defect at any point in automatic regression testing at block 113. If there is a previous defect, the method 100 includes opening the defect against a version stored at block 106, at block 107, and ending the automatic testing algorithm at block 108. If there is no previous defect, the method 100 includes ending testing at block 108.

Returning to block 110, if the method 100 determines that the binary code loaded at block 101 is not a tall binary, the method 100 includes executing the binary code loaded at block 101 as a standalone program at block 104, and continues to block 108 according to the description given hereinbefore.

It is noted that block 108 may include a notification algorithm or somewhat similar notification execution methodology. For example, upon ending execution of automatic regression testing, the method 100 may include notifying a system administrator or user of the results of automatic regression testing at block 108. Similarly, the method 100 may include writing results of automatic regression testing to a log or log file, directing results to an automatic policy manager of a computer system implementing the automatic regression testing, and/or providing a general system notification at block 108. It is further noted that any combination of the above examples should be includes within the scope of example embodiments, and furthermore, further example notification options or methodologies not included herein may be applicable to example embodiments, depending upon any particular implementation.

Figure 2:
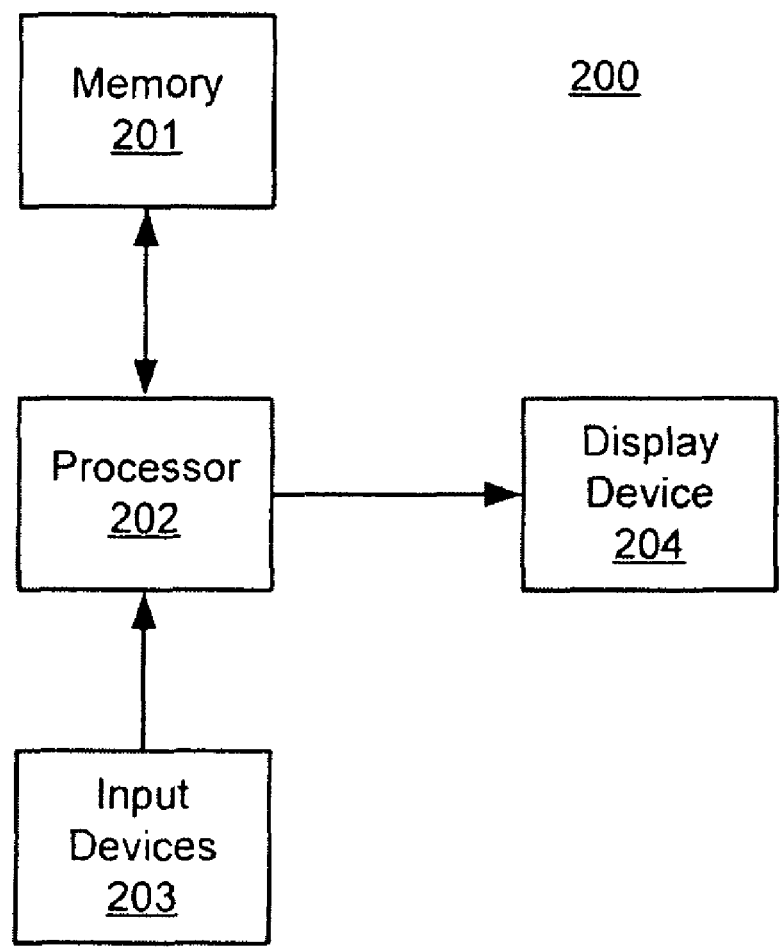
FIG. 2 illustrates a computer apparatus for automatic regression testing, according to an exemplary embodiment.

Furthermore, according to an exemplary embodiment, the method described hereinbefore may be implemented by a computer system or apparatus. For example, FIG. 2 illustrates a computer apparatus for regression testing, according to an exemplary embodiment. Therefore, portions or the entirety of the method may be executed as instructions in a processor 202 of the computer system 200. The computer system 200 includes memory 201 for storage of instructions and information, input device(s) 203 for computer communication, and display device 204. Thus, the present invention may be implemented, in software, for example, as any suitable computer program on a computer system somewhat system to computer system 200. For example, a program in accordance with the present invention may be a computer program product causing a computer to execute the example method described herein.

The computer program product may include a computer-readable medium having computer program logic or code portions embodied thereon for enabling a processor (e.g., 202) of a computer apparatus (e.g., 200) to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method(s) disclosed herein, in accordance with an exemplary embodiment of the present invention.

With an exemplary embodiment of the present invention having thus been described, it will be obvious that the same may be varied in many ways. The description of the invention hereinbefore uses this example, including the best mode, to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Such variations are not to be regarded as a departure from the spirit and scope of the present invention, and all such modifications are intended to be included within the scope of the present invention as stated in the following claims.

What is claimed is:

1. A method of automatic regression testing, comprising:

loading binary code representing a first version of a program;

extracting a second version of the program embedded within the binary code of the first version of the program;

executing a standalone model of the second version of the program based on the extracted second version, wherein executing includes executing a set of instructions to identify at least one error;

determining if the standalone model causes the at least one error;

storing results if the standalone model causes the at least one error; and iterating through all previous versions of the program embedded within the binary code of the first version of the program, wherein iterating includes, extracting a next version of the program embedded within the binary code of the first version of the program, executing a next standalone model of the next version of the program based on the extracted next version, wherein executing includes executing the set of instructions to identify the at least one error, determining if the next standalone model causes the at least one error, and storing results if the next standalone model causes the at least one error.

2. The method of claim 1, further comprising:

determining if the binary code representing the first version of the program includes a plurality of embedded previous versions of the program packaged or stacked within the first version of the program.

3. The method of claim 1, further comprising:

returning the stored results if the standalone model causes the at least one error.

\* \* \* \* \*